United States Patent Office 3,652,666
Patented Mar. 28, 1972

3,652,666
2-(3-BENZYL-2-METHOXY-PHENYL)
ALKANOIC ACIDS
Daniel Farge, Thiais, Mayer Naoum Messer, Bievres, and Claude Moutonnier, Paris, France, assignors to Rhone-Poulenc S.A., Paris, France
No Drawing. Filed Dec. 18, 1969, Ser. No. 886,386
Claims priority, application France, Dec. 20, 1968, 179,627
Int. Cl. C07c 65/14
U.S. Cl. 260—520                     1 Claim

ABSTRACT OF THE DISCLOSURE 2-(3-benzoyl-2-hydroxyphenyl)alkanoic acids of the formula:

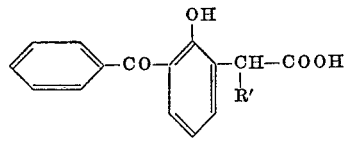

wherein R' is alkyl of 1 through 4 carbon atoms, which are therapeutically useful as anti-inflammatory agents, are prepared by demethylating corresponding 2-(3-benzoyl-2-methoxyphneyl)alkanoic acids, which themselves are obtained by oxidation of the methylene group of corresponding 2-(3-benzyl-2-methoxyphenyl)alkanoic acids to a carbonyl group.

---

This invention relates to therapeutically useful (3-benzoylphenyl)alkanoic acids.

In the specification of British Pat. No. 1,164,585 applied for on Jan. 26, 1968, by Rhone-Poulenc S.A. and entitled "(3-Benzoylphenyl)alkanoic Acids" there are described and claimed (3-benzoylphenyl)alkanoic acids of the general formula:

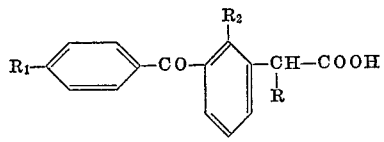

wherein R represents a hydrogen atom or an alkyl group containing 1 to 4 carbon atoms, $R_1$ represents a hydrogen atom or an alkylthio group containing 1 to 4 carbon atoms, and $R_2$ represents a hydrogen atom or a hydroxy or methoxy group, and salts thereof, for example alkali metal, alkaline earth metal, ammonium and amine salts. These compounds, as mentioned in the aforesaid specification, possess pharmacodynamic properties and are particularly useful as anti-inflammatory agents.

It has now been found as a result of research and experimentation that the class of compound of Formula I wherein R represents an alkyl group, $R_1$ represents hydrogen and $R_2$ represents the hydroxy group, i.e. (3-benzoyl-2-hydroxyphenyl)alkanoic acids of the formula:

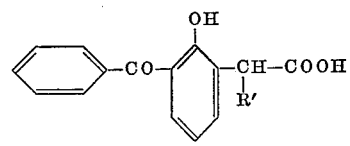

(wherein R' represents an alkyl group containing 1 to 4 carbon atoms), which can exist in optically active forms, can be prepared by a new process, which is not described in British patent specification No. 1,164,585, involving as starting materials 2-(3-benzoyl-2-methoxyphenyl)alkanoic acids of the formula:

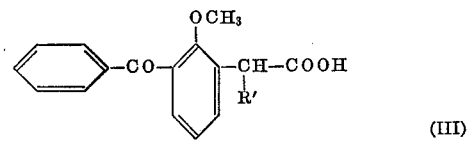

wherein R' is as hereinbefore defined.

According to the present invention, the (3-benzoyl-2-hydroxyphenyl)alkanoic acids of Formula II—in the form of optically active isomers or racemates—are prepared by the process which comprises the demethylation of a 2-(3-benzoyl-2-methoxyphenyl)alkanoic acid of Formula III, which may be optically active, by methods known per se for converting a methoxy substituent on a benzene ring to a hydroxy group. By the term "methods known per se" is meant methods heretofore used or described in the chemical literature. The demethylation is advantageously carried out by heating the alkanoic acid derivative of Formula III in an aqueous acid medium, preferably using hydrobromic acid in aqueous acetic acid.

The 2-(3-benzoyl-2-hydroxyphenyl)alkanoic acids obtained by the aforesaid process can be converted into metal salts or addition salts with nitrogenous bases by application of methods known per se. Thus, these salts can be prepared by the action of an alkali metal (for example sodium, potassium or lithium) or alkaline earth metal base, ammonia or amine, on the acid in an appropriate solvent such as an alcohol, an ether, a ketone or water; the salt formed is precipitated, if necessary after concentration of the solution, and is separated by filtration or decantation.

The alkanoic acid starting materials of Formula III can be obtained by oxidation of the new 2-(3-benzyl-2-methoxyphenyl)alkanoic acids of the formula:

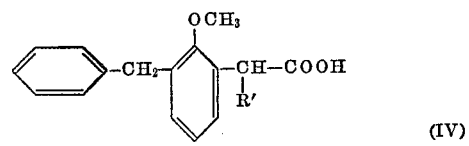

wherein R' is as hereinbefore defined, by methods known per se for the oxidation of a methylene group to a carbonyl group. Preferably, this oxidation is carried out by means of potassium permanganate in a neutral medium at 20° C.

The 2-(3-benzyl-2-methoxyphenyl)alkanoic acids of Formula IV can be obtained by simultaneous hydrolysis and methylation of 2-oxo-3-alkyl-7-benzyl-2,3-dihydrobenzofurans of the formula:

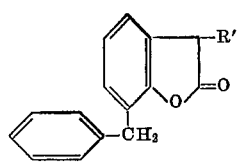

wherein R' is as hereinbefore defined, by heating with a methylating agent in an alkaline medium. Preferably, the reaction is carried out with dimethyl sulphate in aqueous sodium hydroxide solution.

The 2,3-dihydrobenzofurans of Formula V can be obtained by hydrolysis of 2-ethoxycarbonylamino-3-alkyl-7-benzyl-benzofurans of the formula:

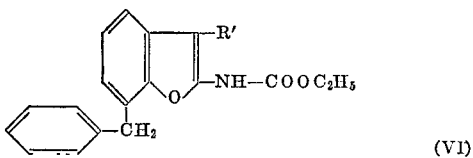

(VI)

wherein R' is as hereinbefore defined. Preferably, the reaction is carried out by heating the compound in a concentrated inorganic acid, for example hydrochloric acid.

The benzofurans of Formula VI can be obtained by heating 2-azidocarbonyl-3-alkyl-7-benzyl-benzofurans of the formula:

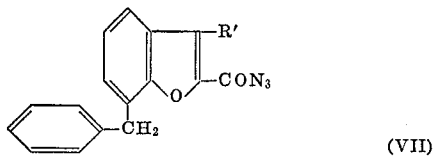

(VII)

wherein R' is as hereinbefore defined, with ethanol under reflux.

The azides of Formula VII can be obtained by treating 2 - chlorocarbonyl - 3 - alkyl-7-benzyl-benzofurans of the formula:

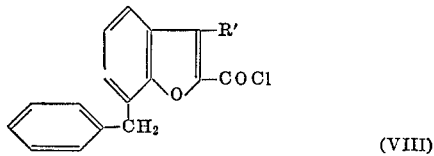

(VIII)

wherein R' is as hereinbefore defined, with sodium azide at a temperature of about 10° C.

The acid chlorides of Formula VIII can be obtained from the corresponding acids in accordance with the usual methods for the preparation of acid chlorides. Preferably, thionyl chloride under reflux is used.

The acids, i.e. 2-carboxy-3-alkyl-7-benzyl-benzofurans of the formula:

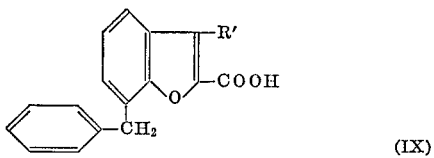

(IX)

wherein R' is as hereinbefore defined, can be obtained by saponification of their ethyl esters in accordance with the usual methods for the saponification of esters.

The esters, i.e. 2 - ethoxycarbonyl - 3 - alkyl-7-benzyl-benzofurans of the formula:

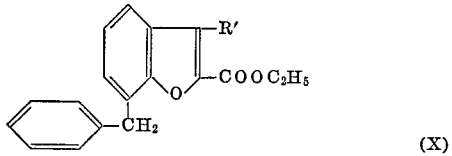

(X)

wherein R' is as hereinbefore defined, can be obtained by cyclisation of ethyl α-(2-benzylphenoxy)acylacetates of the formula:

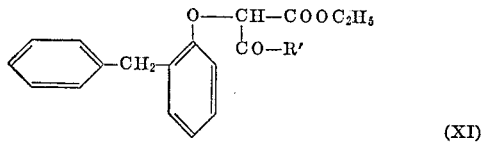

(XI)

wherein R' is as hereinbefore defined. The cyclisation is preferably carried out by heating the ethyl acylacetates of Formula XI in polyphosphoric acid at a temperature of about 100° C.

The compounds of Formula XI can be obtained by the reaction of 2-hydroxy-diphenylmethane with an ethyl α-chloroacylacetate in dimethylformamide in the presence of sodium hydride.

The (3-benzoyl-2-hydroxyphenyl)alkanoic acids of Formula II, none of which is specifically described in British specification No. 1,164,585, possess particularly valuable anti-inflammatory activity, especially 2-(3-benzoyl-2-hydroxyphenyl)propionic acid which, when orally administered to guinea pigs, has exhibited such activity in doses of 0.5 mg./kg. using the technique of C. V. Winder et al., Arch. Int. Pharmacodyn. 116, 261 (1958).

For therapeutic use, the (3-benzoyl-2-hydroxyphenyl)-alkanoic acids of Formula II are employed as such or in the form of pharmaceutically-acceptable salts, i.e. salts which are non-toxic to the animal organism in therapeutic doses of the salts, such as alkali metal, alkaline earth metal, ammonium or amine salts. The alkanoic acids, or pharmaceutically-acceptable salts thereof, may be incorporated in pharmaceutical compositions of conventional types and suitable for oral, parenteral or rectal administration, or topical application, e.g. as ointments and creams. The percentage of active ingredient in the compositions may be varied, it being necessary that it should constitute a proportion such that a suitable dosage shall be obtained. The dosage depends on the desired therapeutic effect, on the route of administration and on the duration of the treatment. In human therapy the compositions should be administered so as to give between 100 and 1,500 mg. of active substance per day.

The following example illustrates the invention.

EXAMPLE

A mixture of 2 - (3 - benzoyl - 2 - methoxyphenyl) propionic acid (19.4 g.), 48% aqueous hydrobromic acid (190 cc.) and acetic acid (190 cc.) is heated under reflux for 17 hours. The mixture is concentrated to dryness under reduced pressure (20 mm. Hg), methanol (100 cc.) and 4 N sodium hydroxide (100 cc.) are added, and the whole heated under reflux for one hour. After concentration to dryness under reduced pressure (20 mm. Hg), water (250 cc.) is added, and the alkaline solution is treated with decolourising charcoal (3 g.) and then acidified to pH 1 by addition of 12 N hydrochloric acid. An oil separates out and is extracted with diisopropyl ether (900 cc.). The ether solution is washed with water (100 cc.) and dried over anhydrous sodium sulphate, treated with decolourising charcoal (3 g.), and concentrated to dryness under reduced pressure (20 mm. Hg). A yellow oil (16.8 g.) is obtained, which is purified by crystallisation from a mixture of diissopropyl ether (60 cc.) and petroleum ether (boiling point 40–65° C.; 90 cc.). 2 - (3 - benzoyl - 2 - hydroxyphenyl)propionic acid (13 g.), melting at 102° C., is thus obtained.

2 - (3 - benzoyl - 2 - methoxyphenyl)propionic acid is prepared as follows:

2 - (3 - benzyl - 2 - methoxyphenyl)propionic acid (19.5 g.) is dissolved in N/10 sodium hydroxide (722 cc.). Water (one litre) is added and a solution of potassium permanganate (45.6 g.) in water (1.9 litres) is run in over a period of 10 minutes. The reaction mixture is stirred for 16 hours at 20° C., acidified by addition of 4.5 N sulphuric acid (200 cc.), and sodium metabisulphite (50 g.) is then added. The mixture is extracted three times with methylene chloride (total 900 cc.) and the extract is dried over anhydrous sodium sulphate, treated with decolourising charcoal (5 g.) and concentrated to dryness under reduced pressure (20 mm. Hg). 2 - (3 - benzoyl - 2 - methoxyphenyl)propionic acid (19.4 g.), melting at 124° C., is thus obtained.

2 - (3 - benzyl - 2 - methoxyphenyl)propionic acid is prepared as follows:

A mixture of 2 - oxo - 3 - methyl - 7 - benzyl - 2,3-dihydrobenzofuran (18.1 g.), 4 N sodium hydroxide (76 cc.) and water (225 cc.) is heated under reflux. Dimethyl sulphate (77 g.) and 4 N sodium hydroxide (152 cc.) are simultaneously added over a period of one hour, the temperature of the reaction mixture being maintained at between 50 and 80° C., and the mixture is then heated for 3 hours under reflux. The reaction mixture is cooled, acidified by addition of 4 N hydrochloric acid (300 cc.), and extracted three times with diethyl ether (total 450 cc.). The ether extracts are dried over anhydrous sodium sulphate, treated with decolourising charcoal (3 g.) and concentrated to dryness under reduced pressure (20 mm. Hg) to yield 2 - (3 - benzyl - 2 - methoxyphenyl)propionic acid (19.5 g.) in the form of an oil.

2 - oxo - 3 - methyl - 7 - benzyl - 2,3 - dihydrobenzofuran is prepared in the following manner:

2 - ethoxycarbonylamino - 3 - methyl - 7 - benzylbenzofuran (63 g.) in 12 N hydrochloric acid (450 cc.) is heated under reflux for 2 hours. The reaction mixture is cooled and extracted three times with diethyl ether (total 1.5 litres). The ethereal solutions are dried over anhydrous sodium sulphate and then treated with decolouring charcoal (3 g.). After filtration and concentration to dryness under reduced pressure (20 mm. Hg), a crystalline residue (52.8 g.) is obtained, which is purified by recrystallisation from cyclohexane (200 cc.). 2 - oxo - 3 - methyl - 7 - benzyl - 2,3 - dihydrobenzofuran (34 g.), melting at 93° C., is thus obtained.

2 - ethoxycarbonylamino - 3 - methyl - 7 - benzylbenzofuran is prepared in the following manner:

A solution of 2 - azidocarbonyl - 3 - methyl - 7 - benzylbenzofuran (48 g.) in ethanol (500 cc.) is heated under reflux for 2 hours. The reaction mixture is concentrated to dryness under reduced pressure (20 mm. Hg) to yield 2 - ethoxycarbonylamino - 3 - methyl - 7 - benzyl - benzofuran (52 g.) melting at 116–117° C.

2 - azidocarbonyl - 3 - methyl - 7 - benzyl - benzofuran is prepared in the following manner:

2 - chlorocarbonyl - 3 - methyl - 7 - benzyl - benzofuran (51.4 g.) is dissolved in acetone (900 cc.). The resulting solution is added over a period of one hour, whilst maintaining the temperature of the reaction mixture at 10° C., to a solution of sodium azide (13 g.) in water (480 cc.); a product crystallises. Water (two litres) is then added and the crystals are filtered off. After washing the crystals with water (1 litre) and drying them in air, 2 - azidocarbonyl - 3 - methyl - 7 - benzyl - benzofuran (48 g.), melting at 88° C., is obtained.

2 - chlorocarbonyl - 3 - methyl - 7 - benzyl - benzofuran is prepared in the following manner:

2 - carboxy - 3 - methyl - 7 - benzyl - benzofuran (127.6 g.) in thionyl chloride (350 cc.) is heated under reflux for 3 hours, and then the reaction mixture is concentrated to dryness under reduced pressure (20 mm. Hg). Benzene (200 cc.) is added and the mixture again concentrated to dryness under reduced pressure (20 mm. Hg) to yield 2 - chlorocarbonyl - 3 - methyl - 7 - benzylbenzofuran (125 g.) melting at 78° C.

2 - carboxy - 3 - methyl - 7 - benzyl - benzofuran is prepared in the following manner:

A mixture of 2-ethoxycarbonyl - 3 - methyl - 7 - benzylbenzofuran (283 g.), ethanol (2 litres) and 10 N sodium hydroxide solution (120 cc.) is heated under reflux for 3 hours. The reaction mixture is concentrated to dryness under reduced pressure (30 mm. Hg), water (2 litres) is added and it is then extracted three times with diisopropyl ether (total 900 cc.).

The aqueous alkaline solution is acidified by addition of concentrated hydrochloric acid (d.=1.19; 200 cc.), and an oil separates out. This is extracted with methylene chloride (2.1 litres), and the methylene chloride extracts are dried over anhydrous sodium sulphate. After treatment with decolourising charcoal (30 g.), filtering and concentrating to dryness under reduced pressure (20 mm. Hg), a crystalline residue (315 g.) is obtained, which is purified by recrystallisation from acetonitrile (800 cc.). 2 - carboxy - 3 - methyl - 7 - benzyl - benzofuran (102 g.), melting at 174° C., is thus obtained.

A further crop of 2 - carboxy - 3 - methyl - 7 - benzylbenzofuran (45 g.), melting at 174° C., is obtained by concentrating the mother liquors to ⅓ of their volume.

2 - ethoxycarbonyl - 3 - methyl - 7 - benzyl - benzofuran is prepared in the following manner:

A mixture of ethyl α-(2-benzylphenoxy)acetylacetate (360 g.) and polyphosphoric acid (3 kg.) is heated for 2 hours at 100° C. with stirring. It is then poured into ice-water (15 litres), extracted with diisopropyl ether (6 litres), and the organic solution washed three times with water (total 2 litres) and dried over anhydrous sodium sulphate. The solution is treated with decolourising charcoal (50 g.), filtered and then concentrated to dryness under reduced pressure (20 mm. Hg) to yield 2-ethoxycarbonyl-3-methyl-7-benzyl-benzofuran (298 g.) in the form of an oil.

Ethyl α-(2-benzylphenoxy)acetylacetate is prepared in the following manner:

2-hydroxy-diphenylmethane (334 g.) is dissolved in dimethylformamide (2.5 litres). Sodium hydride impregnated with Bayol oil (containing 54% of hydride; 80.5 g.) is added under nitrogen over a period of one hour. The mixture is heated under reflux, ethyl α-chloroacetylacetate (298 g.) is then added, and refluxing is continued for one and a half hours. The reaction mixture is concentrated to dryness under reduced pressure and a solution of concentrated sulphuric acid (200 cc.) in water (1.5 litres) is added. This resulting mixture is extracted three times with methylene chloride (total 2.5 litres) and the extracts dried over anhydrous sodium sulphate. After filtering and concentrating to dryness under reduced pressure (20 mm. Hg), a brown oil (675 g.) is obtained. This oil is dissolved in cyclohexane (600 cc.) and chromatographed on silica (2 kg.). Elution is carried out with benzene and a fraction of 10 litres is collected and concentrated to dryness under reduced pressure. Ethyl α-(2-benzyl-phenoxy)acetylacetate (513 g.) is thus obtained in the form of an oil.

2-hydroxy-diphenylmethane is prepared according to Claisen, Ann. Chem., 442, 210 (1925).

Ethyl α-chloracetylacetate is prepared according to W. R. Boehme, Org. Synth., 33, 45 (1953).

We claim:
1. 2-(3-benzyl-2-methoxyphenyl)alkanoic acids of the formula:

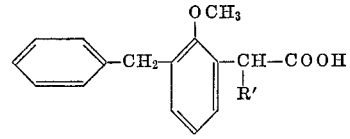

wherein R' is alkyl of 1 through 4 carbon atoms.

References Cited

FOREIGN PATENTS 1,164,585  9/1969  Great Britain _____ 260—520

LORRAINE A. WEINBERGER, Primary Examiner

J. F. TERAPANE, Assistant Examiner

U.S. Cl. X.R.

260—343.3, 473 G, 517; 424—317